United States Patent
Ceesay et al.

(10) Patent No.: US 12,111,846 B2
(45) Date of Patent: Oct. 8, 2024

(54) COMPUTER-BASED SYSTEMS CONFIGURED FOR MACHINE LEARNING ASSISTED DATA REPLICATION AND METHODS OF USE THEREOF

(71) Applicant: Capital One Services, LLC, McLean, VA (US)

(72) Inventors: Ebrima N. Ceesay, McLean, VA (US); Hrishikesh Mukundan Menon, Glen Allen, VA (US); Mohamed Seck, Aubrey, TX (US)

(73) Assignee: Capital One Services, LLC, McLean, VA (US)

( * ) Notice: Subject to any disclaimer, the term of this patent is extended or adjusted under 35 U.S.C. 154(b) by 168 days.

(21) Appl. No.: 17/527,626

(22) Filed: Nov. 16, 2021

(65) Prior Publication Data

US 2023/0153325 A1 May 18, 2023

(51) Int. Cl.
*G06F 17/00* (2019.01)
*G06F 7/00* (2006.01)
*G06F 16/27* (2019.01)
*G06F 21/62* (2013.01)
*G06N 20/00* (2019.01)

(52) U.S. Cl.
CPC ........ *G06F 16/275* (2019.01); *G06F 21/6218* (2013.01); *G06N 20/00* (2019.01)

(58) Field of Classification Search
CPC .... G06F 16/275; G06F 21/6218; G06N 20/00
USPC ........................................................ 707/610
See application file for complete search history.

(56) References Cited

U.S. PATENT DOCUMENTS

| | | | |
|---|---|---|---|
| 7,526,684 B2 | 4/2009 | Bicknell et al. | |
| 8,335,765 B2 | 12/2012 | Sivasubramanian et al. | |
| 10,268,553 B2 | 4/2019 | Eggert et al. | |
| 10,671,639 B1 * | 6/2020 | Acheson | G06F 16/2246 |
| 10,952,222 B1 * | 3/2021 | Wires | H04L 47/83 |
| 2020/0007620 A1 * | 1/2020 | Das | H04L 67/62 |
| 2020/0026571 A1 * | 1/2020 | Bahramshahry | G06F 9/5005 |
| 2020/0293550 A1 * | 9/2020 | Acheson | G06F 16/2246 |
| 2021/0072895 A1 * | 3/2021 | Cheru | G06F 3/065 |
| 2021/0089212 A1 * | 3/2021 | Muniswamy-Reddy | G06F 3/064 |
| 2021/0089662 A1 * | 3/2021 | Muniswamy-Reddy | H04L 63/166 |
| 2021/0390113 A1 * | 12/2021 | Danilov | G06F 16/27 |
| 2022/0027051 A1 * | 1/2022 | Kant | G06F 3/0617 |

\* cited by examiner

*Primary Examiner* — Pavan Mamillapalli
(74) *Attorney, Agent, or Firm* — Greenberg Traurig, LLP

(57) ABSTRACT

Systems and methods of data replication via machine learning techniques are disclosed. In one embodiment, an exemplary computer-implemented method may comprise: utilizing a trained replication machine learning model to identify an existing object in the bucket for replication, and a commencing time to replicate the existing object, the commencing time determined based on replication failure predicted by the replication machine learning model; capturing, in response to identifying the existing object for replication, a snapshot of the bucket, the snapshot comprising information related to at least one of: the existing object, metadata of the existing object, and/or an access control list (ACL) of the existing object; and replicating the existing object to a destination cloud according to the determined commencing time, the destination cloud being hosted at a cross-region storage.

20 Claims, 12 Drawing Sheets

COMPUTER-BASED SYSTEMS CONFIGURED FOR MACHINE LEARNING ASSISTED DATA REPLICATION AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-implemented methods, improved computer-based platforms or systems, improved computing components and devices configured for one or more practical technological improvement applications utilizing one or more machine learning techniques to replicate data, including, but not limited to, data objects from a source storage to a destination storage across regions.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with electronic transactions, data processing, data archiving, and/or service management. For example, without limitation, data critical to operations of services provisioned via a hosting cloud storage service may require automated backup regardless of its status, such as being brand new (e.g., never being backed before), or being existent (e.g., may have been backed up before or deemed as no backup needed before). When the hosting cloud storage service does not provide native support of automatic archiving of such (e.g., Amazon Simple Storage Service™ (Amazon S3) can only backup net new objects in buckets and require manual setup to backup existent objects with Cross Region Replication (CRR)), critical data may not be archived with sufficient duplicity or sufficient duplicity across regions to enable true backup and resilient discovery against disasters.

SUMMARY OF DESCRIBED SUBJECT MATTER

In some embodiments, the present disclosure provides various exemplary technically improved computer-implemented methods involving data replication, the method including steps such as: obtaining, by one or more processors, a trained replication machine learning model that is trained to detect at least one object in a bucket at a source cloud for replication, and a timing for replicating the at least one object; utilizing, by the one or more processors and in response to the bucket being configured with a cross region replication (CRR) service, the replication machine learning model to identify an existing object in the bucket for replication via the machine learning model; determining, by the one or more processors, a commencing time to replicate the existing object, the commencing time determined based on replication failure predicted by the replication machine learning model; capturing, by the one or more processors and in response to identifying the existing object for replication, a snapshot of the bucket, the snapshot including information related to at least one of: the existing object, metadata of the existing object, and/or an access control list (ACL) of the existing object; and replicating, by the one or more processors, the existing object to a destination cloud according to the determined commencing time, the destination cloud being hosted at a cross-region storage.

In some embodiments, the present disclosure also provides exemplary technically improved computer-based systems, and computer-readable media, including computer-readable media implemented with and/or involving one or more software applications, whether resident on personal transacting devices, computer devices or platforms, provided for download via a server and/or executed in connection with at least one network and/or connection, that include or involve features, functionality, computing components and/or steps consistent with those set forth herein.

BRIEF DESCRIPTION OF THE DRAWINGS

Various embodiments of the present disclosure can be further explained with reference to the attached drawings, where like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
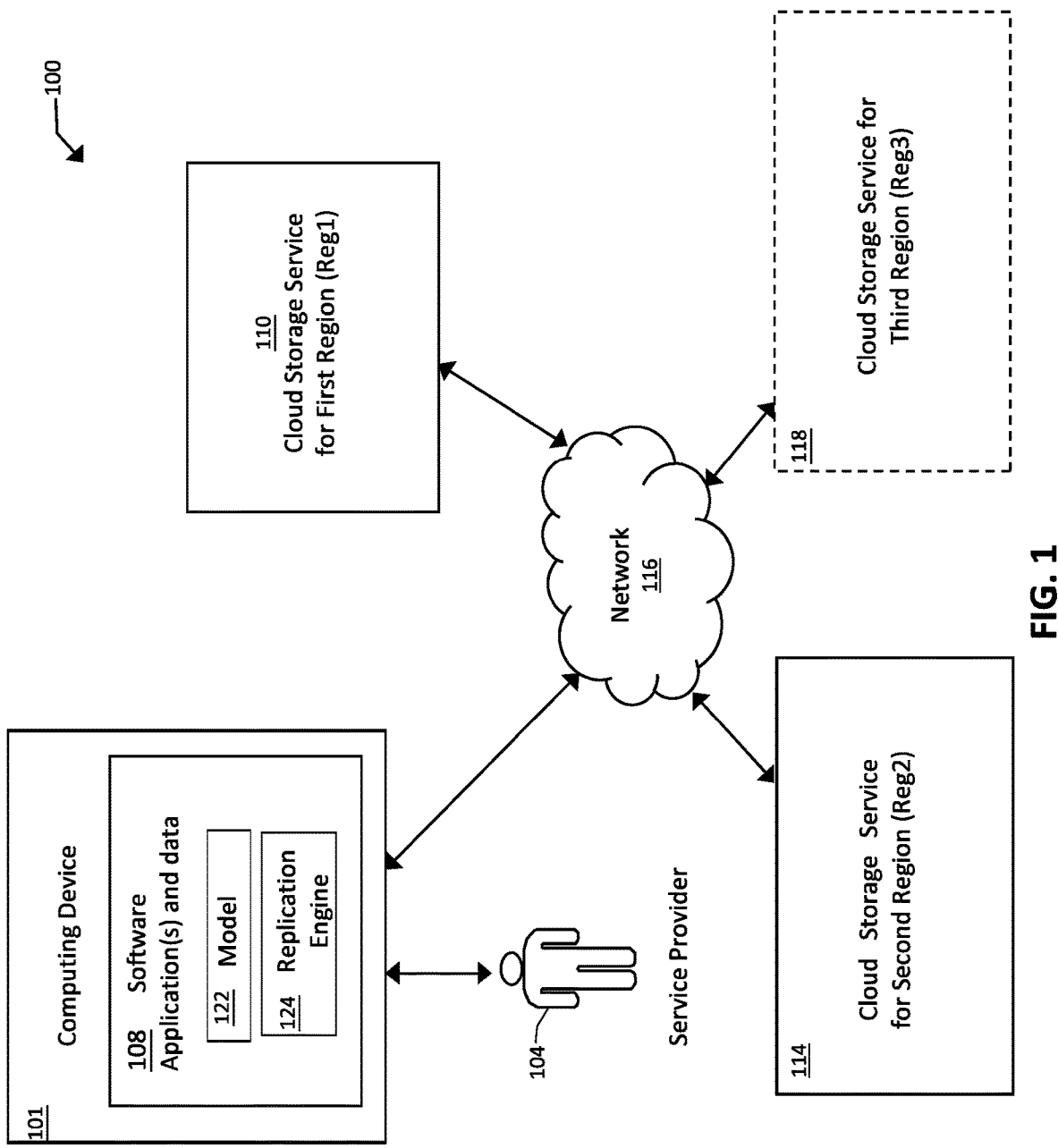
FIG. 1 is a block diagram of an exemplary system and/or platform illustrating features associated with data replication (e.g., object replication), consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

To benefit from the intelligence gleaned from replication related events and at the same time to leverage advanced data processing capabilities to identify data for selective and proactive replication, various embodiments of the present disclosure provide for improved computer-based platforms or systems, improved computing components and devices configured for one or more novel technological improvements involving: profiling data container(s) (e.g., bucket(s)) of data object(s)) to identify data item(s) for replication (e.g., existing object(s) including sensitive data), determining a replication commencing time to replicate data item(s) (e.g., existing data object(s)), as well as generating intelligence (e.g., machine learning model(s), etc.) empowered by the various replicated data items (e.g., data objects), historical replication patterns, and/or historical replication failure events to, for example, automate the replication of existent objects with enhanced timeliness, redundancy, efficiency, accuracy, comprehensiveness, integrity, and authenticity towards more robust data archiving, hereby ensuring business continuity and resilient disaster recovery, in supplement to and/or independent from other known or to be known data replication techniques.

For purposes of illustration, data structures and operations specific to Amazon S3 provided in the Amazon AWS environment are used as non-limiting examples to describe embodiments of the present disclosure. It should be understood that aspects of the disclosed technological improvement apply to various other replication services and/or cloud storage services, such as MICROSOFT AZURE™, GOOGLE CLOUD PLATFORM™, and ALIBABA CLOUD STORAGE™, not limited by the embodiments based on Amazon S3.

As used herein, in some embodiments, the term "bucket" refers to a data container (e.g., a web folder) for objects (files) stored in Amazon S3, a cloud storage service that provides various cloud-based computation, storage, and/or other functionality to organization users and/or individual users. Amazon S3 provides object-level storage with a web service interface (e.g., REST, SOAP) to store, retrieve, and manage data. Every Amazon S3 object is contained in a bucket. Buckets may form the top-level namespace for Amazon S3; and bucket names may be global such that they are unique across all Amazon AWS accounts, not just within the individual account owning the buckets. Users can create and use multiple buckets under respective accounts. In some implementations, buckets can be named to contain their domain name and conform to the rules for DNS names. As a result of this global naming scheme, bucket names can be referenced or used across all regions. In some embodiments, a bucket may be a flat folder with no file system hierarchy.

As used here, in some embodiments, the terms "object" and "data object" refer to an entity or a file stored in Amazon S3 buckets. An object may store virtually any kind of data in any format, in size ranging from 0 bytes up to 5 TB. An Amazon S3 object may include data (e.g., the file itself), and/or metadata (e.g., data about the file). The data portion of an object may be treated by Amazon S3 as simply a stream of bytes without differentiating what type of data is stored at the object. The metadata associated with an Amazon S3 object may be a set of name/value pairs that describe the object. There are two types of metadata: system metadata and user metadata. System metadata may be created and used by Amazon S3 itself to include information such as the date last modified, object size, MD5 digest, and HTTP Content-Type, and so on. User metadata may be specified at the time an object is created by a user. A user may customize user metadata to tag their data with attributes/classifications. Each object may have a unique object key (e.g., file name) that serves as an identifier for the object within a particular bucket.

Various embodiments disclosed herein may be implemented in connection with one or more entities that provide, maintain, manage, and/or otherwise offer any services involving various data and data archiving/recovery system(s). In some embodiments, the exemplary entity may be a financial service entity that provides, maintains, manages, and/or otherwise offers financial services. Such financial service entity may be a bank, credit card issuer, or any other type of financial service entity that generates, provides, manages, and/or maintains financial service accounts that entail providing a transaction card to one or more customers, the transaction card configured for use at a transacting terminal to access an associated financial service account. In some embodiments, financial service accounts may include, for example, credit card accounts, bank accounts such as checking and/or savings accounts, reward or loyalty program accounts, debit account, mortgage account, auto vehicle loan account, and/or any other type of financial service account known to those skilled in the art.

FIG. 1 depicts an exemplary computer-based system 100 illustrating aspects of technologically improved data replication (e.g., object replication) via utilization of at least one machine learning technique, in accordance with one or more embodiments of the present disclosure. An exemplary system 100 may be configured for providing cloud storage services 110, 114, and 118 for executing applications and software programs, data storage, and other functionality via a computing device 101. As shown, the computing device 101 may be associated with a user 104 (e.g., a service provider, or an individual user) to deploy various application(s) and service(s) on, for example, an on-demand basis and at various pricing models. Computing device 101 may be configured to communicate with the cloud storage services 110, 114 and 118 running in different regions, such as a first region, a second region, a third region, and/or other regions. As shown, computing device 101, cloud storage service 110 for the first region, cloud storage service 114 for the second region, cloud storage service 118 for third region, and other elements (not shown) may be communicatively coupled by a network 116.

In some embodiments, the cloud storage services 110, 114, and 118 may be implemented with one or more platforms such as Amazon WEB SERVICES™ (AWS), GOOGLE CLOUD PLATFORM™ (GCP), and MICROSOFT AZURE™, and the like. However, it should be understood that system 100 can include any type and/or any number of cloud storage services, not limited to these examples. In various embodiments, the computing device 101 may be configured to execute software application(s) and data 108 deployed via, in conjunction with, or independently from the cloud storage services 110, 114, and/or 118. In some embodiments, the software application(s) and data 108 may include software application(s) and data that is executed by the user first creating and running computing instances on the cloud storage services. In some embodiments, the software application(s) and data 108 may include software application(s) and data that is created and/or executed by the user utilizing the computing resources local to the computing device 101, and/or computing resources not relying on the cloud storage services 110, 114, or 118. In some embodiments, the software application(s) and data 108 may include software application(s) and data that is created and/or executed by the user utilizing a combination of services provisioned via the cloud storage services 110, 114, 118, as well as the computing resources other than those available at the cloud storage services 110, 114, 118.

In some embodiments, the computing device 101 may utilize the cloud storage services 110, 114, and 118 to deploy the software application(s) and data 108 to include functionality and/or services including, such as, archiving on-premises or cloud data, content, media, and software storage and distribution, data analytics; website hosting; cloud-native mobile and Internet application hosting, disaster recovery, and so on. In some embodiments, the computing device 101 may also utilize the cloud storage services 110, 114, and 118 to configure and/or provide various permissions, access controls, authentication, and encryption options in association with the software application(s) and data 108 executed and/or stored thereon.

While only one computing device 101 and network 116 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. In some embodiments, computing device 101 may include one or more general purpose computers, servers, mainframe computers, desktop computers, etc. configured to execute instructions to perform various operations that are consistent with one or more aspects of the present disclosure. In some embodiments, computing device 101 may include a single server, a cluster of servers, or one or more servers located in local and/or remote locations. Computing device 101 may be standalone, or it may be part of a subsystem, which may, in turn, be part of a larger computer system. In some embodiments, computing device 101 may be associated with a financial institution, such as a credit card company that has issued transaction card(s) to the user, maintains financial account(s) for the user, holds loan account(s) for the user, and thereby having access to various information with regard to the user's online login credentials, transaction card based transactions, loan (e.g., auto mobile loan, mortgages, etc.) related information, and the like.

Computing device 101 may include at least one processor, and a memory, such as random-access memory (RAM). In some embodiments, memory may store application(s) and data such as the software application(s) and data 108. Various embodiments herein may be configured such that the application(s) and data, when executed by the processor, may provide all or portions of the features and functionality associated with communication with the cloud storage services 110, 114, and 118, as well as data replication via one or more machine learning techniques, in conjunction with or independent of the features and functionality implemented at the cloud storage services 110, 114, and 118.

In some embodiments, the features and functionality associated with data replication via one or more machine learning techniques may include operations such as: obtaining training data (e.g., a plurality of historically replicated objects, a plurality of historical replication patterns, and/or a plurality of historical replication failure events); training a replication machine learning model with the training data; and utilizing the trained replication machine learning model to: identify an existing object in the bucket for replication and determine a commencing time to replicate the existing object; capturing a snapshot of the bucket; and replicating the existing object to a destination cloud according to the determined commencing time, the destination cloud being hosted at a cross-region storage.

In some embodiments, the application(s) and data 108 may include an exemplar replication machine learning model 122. In some embodiments, the replication machine learning model 122 may be trained at the computing device 101. In other embodiments, the replication machine learning model 122 may be trained by another entity with the training data provided by the another entity, and/or with the training data provided by computing device 101. In some embodiments, the replication machine learning model 122 may also be trained via the computing resources provisioned at one or more of the cloud storage services 110, 114, and 118. In some embodiments, the replication machine learning model 122 may re-trained at the computing device 101 with feedback data, and/or training data specific to operations via the computing device 101.

Various machine learning techniques may be applied to train and re-train the replication machine learning model 122 with training data and feedback data, respectively. In various implementations, such a machine learning process may be supervised, unsupervised, or a combination thereof. In some embodiments, such a machine learning model may include a statistical model, a mathematical model, a Bayesian dependency model, a naive Bayesian classifier, a Support Vector Machine (SVMs), a neural network(NN), and/or a Hidden Markov Model.

In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of neural network may be executed as follows:

i) Define Neural Network architecture/model, ii) Transfer the input data to the exemplary neural network model, iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments, and as illustrated with reference to FIG. 2B below, the exemplary replication machine learning model may be in the form of a regression model, a classifier, and/or a recommendation model. By way of non-limiting example, a regression model may include a linear regression model, or a non-linear regression model, and the like; a classifier may include a binary classification model, a multi-class classification model, a multi-label classification model, and the like; a recommendation model may include a collaborative filtering model, a knowledge based recommender model, and the like.

In some embodiments and, optionally, in combination of any embodiment described above or below, the exemplary replication machine learning model 122 may be in the form of a neural network, having at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The software application(s) and data 108 may include a replication engine 124 that may be programmed to execute the replication machine learning model 122. In some embodiments, the replication engine 124 may receive, as input, the monitored information pertaining to task execution and utilize the replication machine learning model 122 to identify existing objects for replication, as well as the commencement timing to start replicate the identified objects. Subsequently, the replication engine 124 may initiate a process to replicate the identified objects at the determined commencement timing. More details of the replication machine learning model 122 and the replication engine 124 are described with reference to FIGS. 2A-2B, below.

In some embodiments, for the purpose of simplicity, features and functionalities associated with the exemplary replication machine learning model 122 (e.g., training, re-training, etc.) are illustrated as implemented by components of the computing device 101. It should be noted that one or more of those replication machine learning model-related aspects and/or features may be implemented at or in conjunction with a cloud storage service. For example, in some embodiments, the machine learning model 122 may be partially trained via a service at the cloud storage service 110 with training data related to other users' services, and in turn transmitted to the computing device 101 to be fully trained with the user specific training data. In another example, the converse may be performed such that the machine learning model may be initially trained at the computing device 101 and subsequently transmitted to the service at the cloud storage service 110 for further training with training data from other users.

Figure 2A:
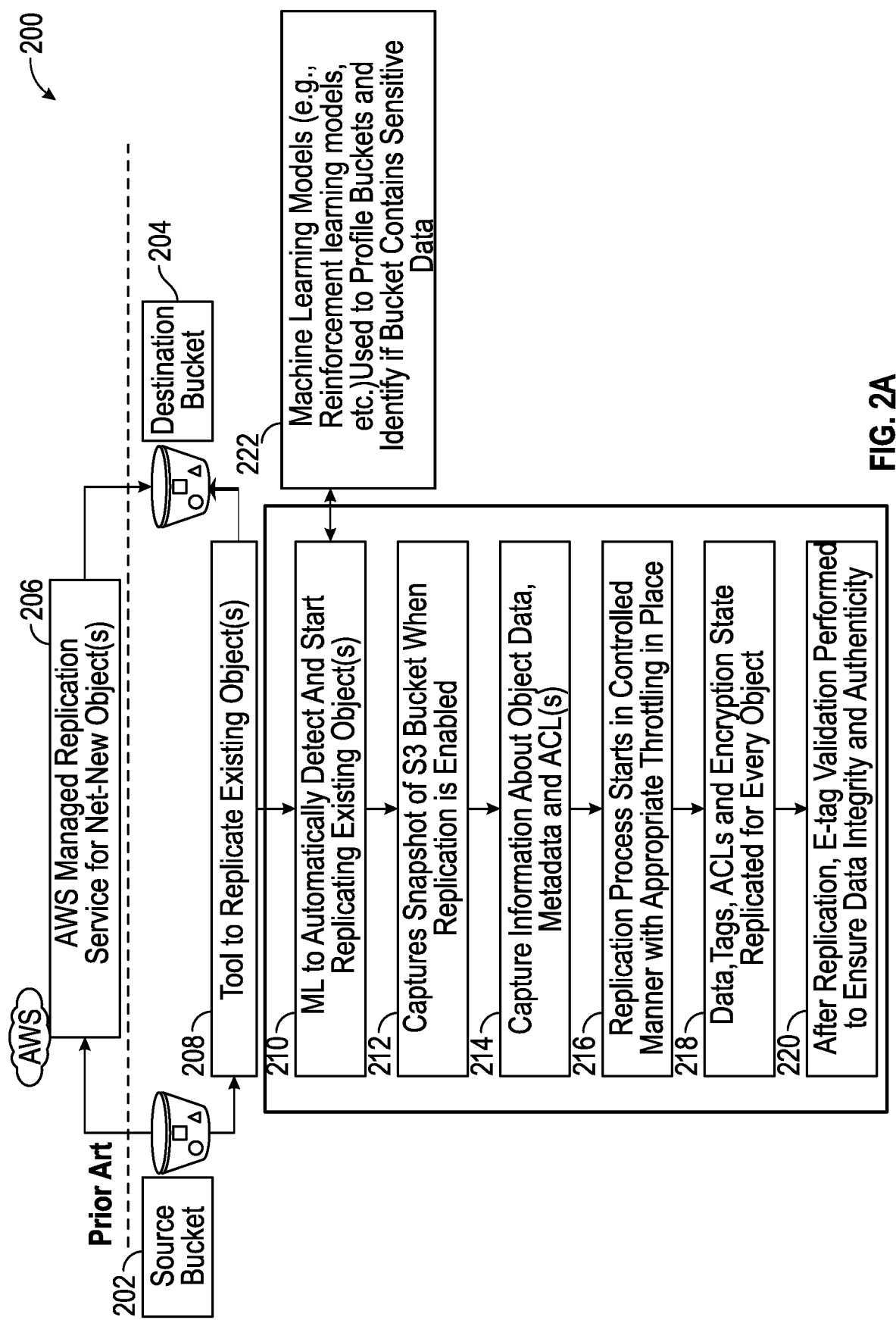
FIG. 2A is a diagram of an exemplary architecture illustrating features associated with data replication (e.g., object replication), consistent with exemplary aspects of certain embodiments of the present disclosure.

FIG. 2A is a diagram illustrating an exemplary data replication architecture using one or more machine learning techniques, consistent with exemplary aspects of certain embodiments of the present disclosure. In this illustrated embodiment, the exemplary data replication architecture 200 may replicate data in the form of objects via two replication services to duplicate one or more data objects from a source bucket 202 to a destination bucket 204. The first replication service, as known in the art, may include an Amazon AWS managed replication service 206 (e.g., Amazon S3) for archiving net new objects from the source bucket 202 to the destination bucket 204. The second replication service may include a replication tool 208 (e.g., replication engine 124 of FIG. 1) for archiving existing objects from the source bucket 202 to the destination bucket 204. In some embodiments, the source bucket 202 and the destination bucket 204 may spread across multiple data centers in a geographical region, or multiple data centers in different geographical regions such that, for example, the replicated data objects and services relying thereof are resilient to single data center failures and/or reginal data center failures.

Although Amazon AWS buckets and data objects are used for purposes of illustration, it should be understood that data of any format or structure, as well as any data container and/or data storage of any suitable environments or platforms may be used to implement various embodiments of improved data replication disclosed herein. By way of non-limiting examples, data replication may be applied to resources of Microsoft Azure™ blobs, Google Cloud Platform™ (GCP) buckets, and Alibaba Cloud Storage™ buckets, and the like.

Here, the exemplary Amazon AWS managed replication service 206 may include a Simple Storage Service™ (S3) that is typically configured with a web service interface to store and/or retrieve data at an object-level in cloud storage. For instance, Amazon S3 may provide standards-based REST and SOAP web service APIs for management and data operations. In operations, these APIs may allow objects to be stored in uniquely-named buckets, with each object being under a unique object key serving as an identifier for the object in the bucket. However, the Amazon AWS managed replication service 206 generally only operates on the whole object level, instead of incrementally updating portions of the objects as one would with a file.

Accordingly, using the Amazon AWS managed replication service 206, the user may only request Amazon S3 to automatically replicate any objects that are brand new to a bucket. For example, the user may specify in a replication configuration file at Amazon S3 to replicate all new objects in the source bucket 202, replicate a subset of new objects in the source bucket 202 (e.g., via a configured filtering rule based on factors such as an object key pre-fix, tags, etc.), replicate new objects to the source bucket 202 in the same region or across regions to the destination bucket 204, and the like. On the other hand, when it comes to backup existing object(s) in the source bucket 202, the user has to manually contact the Amazon AWS support, providing information such as, the identification of the source bucket 202, the identification of the destination bucket 204, an estimated storage volume to replicate (e.g., in terabyte), and an estimated storage object count, in order to initiate a replication process for those existing objects in the source bucket 202, in the same region or across regions.

Various embodiments disclosed herein may be configured to supplement the Amazon AWS managed replication service 206 to archive object(s) existing in buckets for duplicated cloud storage. For example, the user of the object replication architecture 200 may be enabled to provide Cross Region Replication (CRR) of existing objects in the source bucket 202 by using the replication tool 208.

In the embodiment illustrated in FIG. 2A, the replication tool 208 may utilize a replication machine learning model to detect and thereby automatically start (210) replicating one or more existing objects in the source bucket 202. Here, the replication tool 208 is shown to replicate existing object(s) from the source bucket 202 to the same destination bucket 204 to which the Amazon AWS managed replication service 206 replicates the brand new objects. The replication tool 208 in other embodiments may be configured to replicate existing object(s) to a destination bucket other than the destination bucket 204. For example, the replication tool 208 may replicate existing object(s) to a bucket hosted in a geographical region different from the geographical region(s) hosting the source bucket 202, and/or the destination bucket 204.

To perform selective and proactive object replication, the replication tool 208 may first utilize the machine learning model to profile (222) buckets to identify whether a bucket contains sensitive data, and/or which objects of a bucket contain sensitive data. Any suitable machine learning techniques may be applied to profile buckets for such data and/or objects. For example, a reinforcement machine learning model may be applied to profile buckets. More details of the machine learning model as well as the profiling of buckets based thereof are described with reference to FIG. 2B, below.

In some embodiments, sensitive data may include any information that indicates or affords a condition or status for warranting sufficient duplicity. For example, sensitive data may include at least one of: a social security number, a personal identification number associated with authentication, a communication account associated with multi-factor authentication, a home address, a work address, a bank account, a credit card number, a driver's license number, a registered automobile plate number, a birthdate, and so on. In some implementations, sensitive data may involve in operations related to or servicing, for example, consumer loan transactions, consumer credit card transactions, consumer financial account management, and the like.

Stilling referring to FIG. 2A, once equipped with the knowledge of which existing objects in the source bucket 202 contain sensitive data and therefore in need of replication, the replication tool 208 may automatically start a replication process for the identified existing objects. In some embodiments, the replication tool 208 may only need to identify at the bucket level whether there is any sensitive data in a bucket, and start replicating all of the existing objects in the bucket. In some embodiments, the automated start of a replication process may be enabled by further determining a commencing time to replicate the existing objects. In some implementations, the replication tool 208 may utilize the replication machine learning model to predict a commencing time to replicate the identified existing objects in the bucket 202. In some embodiments, various techniques may be applied to provision automated replication of identified existing objects. By way of non-limiting example, the replication tool 208 may automate such replication processes at a pre-configured interval of time for a set of one or more buckets, at a differently pre-configured interval of time for another set of one or more buckets, and so on.

As illustrated in the embodiment of FIG. 2A, the replication tool 208 may rely on the information and operations provided by the Amazon S3 service to replicate the existing one or more objects for supplemental archiving. Other embodiments may be configured such that the replication tool 208 may replicate the existing objects using any suitable techniques.

Here, the replication tool 208 may capture (212) a snapshot of the source bucket 202 when the replication is enabled. Next, the replication tool 208 may obtain (214), for the existing object(s) for replication, information including object data, metadata of the object(s), tags of the object(s), the access control list (ACL), and the like. In some embodiments, the replication tool 208 may also capture the ACL specified for the source bucket. Metadata may include system defined metadata, and/or user customized metadata. With ACL(s) recorded, the replication tool 208 not only has the information to duplicate the existing object(s), but also the information that specifies the relationship(s) and operations/usage of the object(s) (e.g., which Amazon AWS account holder(s) has access to the object(s) in terms of, e.g., read, write, etc.). With Amazon S3, the user can associate tags with an object for categorization. Each tag may include a key-value pair. For example, an object may be tagged as containing protected health information, protected login credentials, and the like.

In some embodiments, with the information required for replication ready, the replication tool 208 may start the replication process according to the determined commencing time. In other embodiments, the replication tool 208 may impose additional controls over the replication process. In one embodiment and as shown herein, the replication tool 208 may start (216) the replication process in a controlled manner with configured throttling in place. Various techniques may be applied to control the replication process with throttling appropriate under the circumstances. For example, throttling may be configured based on existent throttling limit(s) configured (e.g., via Amazon S3 platform) with regard to per-client limit(s), per-method limit(s), account level limit(s) per region, and the like. Limits may include a number of API calls per second invoked by the replication tool 208 to duplication object(s) from the source bucket 202 to the destination bucket 204. In other embodiments, in addition to and/or independent of the support provided at the cloud storage platform (e.g., Amazon S3), the replication tool 208 may implement its own throttling mechanism to control the timing, pacing, and scheduling of the duplication of the object(s) based on the determined commencing time and in the context of other operations involving objects in the source bucket 202 and the destination bucket 204.

Here, the replication tool 208 may replicate the identified existing object(s) from the source bucket 202 to the destination bucket 204. In some embodiments, the replication tool 208 may replicate (218) the data, metadata, tags, ACLs, as well as encryption states, for each identified object in the source bucket 202 for backup storage at the destination bucket 204. In some embodiments, after the replication of the above-described information of the object(s) is complete, the replication tool 208 may perform entity tag (e-tag) validation (220) on the replicated objects to ensure data integrity and authenticity in the replica. In one example, e-tags may be implemented using the MD5 algorithm. For instance, the replication tool 208 may calculate the content-MD5 value of the existing objects and verify the integrity of the replaced object by passing the content-MD5 value as a request header during the upload of the replicated object to the destination bucket.

Various embodiments herein provide an intelligent replication service to automatically replicate existing object(s) in S3 bucket(s) without having to contact AWS Support. As such, the backup and disaster recovery practices enabled thereby are enhanced to meet compliance requirement(s), increase operational efficiency, resilience, and minimize latency in various operational environments. For instance, with the exemplary machine learning techniques disclosed herein, existing object(s) in buckets can be intelligently replicated at the moment Amazon AWS CRR is enabled on a bucket containing existing object(s).

Figure 2B:
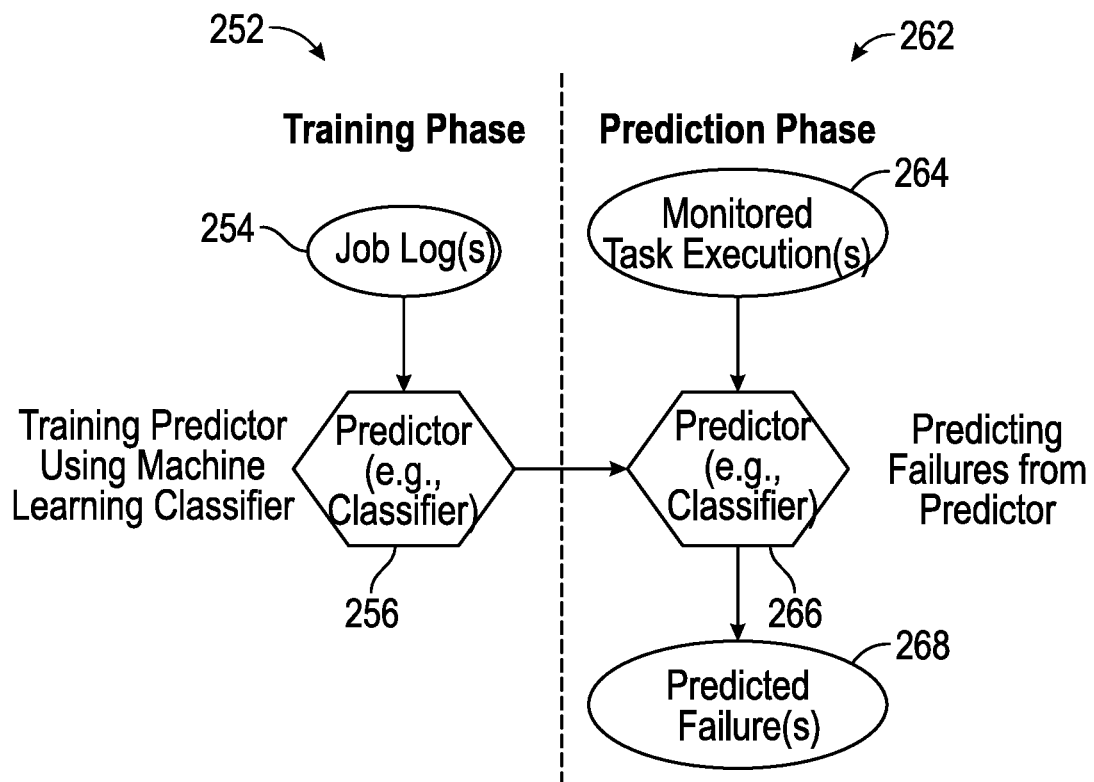
FIG. 2B is a diagram of an exemplary architecture illustrating features associated with one or more machine learning techniques involved in data replication (e.g., object replication), consistent with exemplary aspects of certain embodiments of the present disclosure.

FIG. 2B is a block diagram illustrating an exemplary system involving a machine learning based replication model, consistent with various aspects of the disclosure. As shown in FIG. 2B, system 250 includes a training phase 252 that trains a replication machine learning model; and a prediction (e.g., execution) phase 262 that uses the replication machine learning model, trained in the phase 252, to predict failures and/or errors associated with data replication. Various embodiments herein may be configured such that the replication machine learning model may be trained with other suitable training data, e.g., failure events associated with operations involving existing objects, and the like.

In some embodiments, the training phase 252 may utilize various training data to train a replication machine learning model. As illustrated in FIG. 2B, the replication machine learning model may be trained with job logs 254. In some embodiments, the job logs 254 may include information pertaining to a plurality of historical replication jobs. For example, the job logs 254 may include data of a plurality of historically replicated objects, a plurality of historical replication patterns, or a plurality of historical replication failure events. In some embodiments, the historically replicated objects, historical replication patterns, and historical replication failure events may involve objects residing in the same bucket, objects residing in different buckets hosted at the cloud storage of the same geographical region, objects residing in different buckets hosted at cloud storage at different geographical regions, or any combination thereof.

Here, in this example, the job logs 254 may be utilized to train a predictor 256 (e.g., a replication machine learning model) to predict whether and/or when a replication failure is about to occur. The predictor 256 may include various machine learning models suitable for respective types of prediction. For example, the predictor 256 may include a regression model, a classifier, a recommendation engine model, or some combinations thereof. In some embodiments, to facilitate the replication tool 208 to back up objects critical and/or of high priority in replication, a regression model may be trained to predict whether a replication failure is about to happen within a certain time window (e.g., in the next 5 minutes, 15 minutes, one hour, one day, etc.). Using models such as a regression model, the predictor 256 may predict how much time a user has before a replication failure hits such that the user may act proactively in defense of the predicted failure. This way, critical objects and/or objects having high priority in replication may be safeguarded with duplicity not only sufficient, but also timely in defense of replication failures in operation. In some implementations, the job log may be parsed to extract training data that include information to sufficiently train a regression model. For example, the job log may include information pertinent to whether the object associated with the replication is critical and/or of a high priority in replication, size of the replication, timestamps associated with various replication statuses of the replication (e.g., progresses with regard to completing the replication), throttling conditions associated with the replication, timestamps associated with the failing point of the replication, and so on.

In some embodiments, to facilitate the replication tool 208 to back up objects less critical and/or of having lower priority in replication, a classifier may be trained to predict whether a replication failure is about to happen immediately, or otherwise is imminent. Compared to the regression model described above, the predictor 256 using a classifier may be trained to predict replication failures with a relaxed precision that does not require predicting an exact point of time when a replication failure is about to happen. This way, for objects that are less critical or have lower priority in replication, the predictor 256 may be trained to supply relatively short notice for the replication tool 208 to act upon. In some examples, focusing on predicting imminent failures, the predictor 256 may not need to predict a replication failure that is too far in the future, or if there is going to be a replication failure at all. In some embodiments, the definition how close up in time means imminence and the definition of window of time may be configured by the user. In other embodiments, such definitions may be learned via various machine learning techniques as well, via training data of the same user, similar users, other users, users having objects involving in similar operations, and so on. In some implementations, the job log may be parsed to extract training data that include information to sufficiently train a classifier. For example, the job log may include information similar to those described above with regard to a regression model. In another example, the job log may include a reduced set of data associated with an indication that the object is associated with the replication is less critical and/or of a low priority in replication, size of the replication, timestamps associated with the failing point of the replication, and so on. In one example, the job log may include various metrics associated with Amazon S3 replication.

In some embodiments, a recommendation engine model may be trained to predict (recommend) one or more replications that can remedy a foreseen replication failure. In some embodiments, a system implementing the above illustrated replication architecture 200 of FIG. 2A may be configured to track successful replication patterns for various stages of replication jobs. Based on the monitoring, the system may be configured to recommend (e.g., thumb-up) or dis-recommend (e.g., thumb-down) one or more prior fixes of failed replications, and apply collaborative filtering to filter out fixes that may not remedy the particular replication failures/issues at hand based on reactions with similar fixes. In this scenario, the replication tool 208 may start replications for existing objects based on the recommendation and/or dis-recommendation by the predictor 256. In some implementations, the job log may be parsed to extract such replication patterns and/or prior fixes of failed replications. The job log may include information similar to the one described with regard to a regression model, as well as observed data with regard to the historical fixes that remedy or recover the failed replications.

For example, the predictor 256 may be trained to search in a pool of historical replication jobs for a set of replication jobs having replication pattern(s) similar to the one exhibited by a current replication job. From this set of replication jobs, the predictor 256 may recommend or dis-recommend specific replication jobs by, for example, creating a ranked list of suggestions. In another example, the predictor 256 may otherwise use the dis-recommended replication jobs to create a ranked list of non-suggestion. In some embodiments, the predictor 256 may create both a list of suggestions and a list of non-suggestion.

The prediction phase 262 may apply the trained predictor 266 to monitored task execution(s) 264 to predict replication failure(s) 268 that are about to happen. In various embodiments, monitored task execution(s) 264 may include information pertaining to one or more replication jobs that are ongoing. In other embodiments, monitored task execution(s) 264 may include information pertaining to operations other than replication tasks and involving the existing objects in buckets. In some embodiments, the prediction phase 262 may further include a set of feedback data (not shown) to re-train the predictor 256 with additional training data compiled from confirmed prediction of failure(s), partially confirmed prediction of failure(s), incorrectly predicted failure(s), etc., which include data related to respective replicated object(s), replication pattern(s) items, replication failure event(s).

In some embodiments, the trained predictor 266 may be utilized to predict one or more events that precede such an identified failure. In some embodiments, the trained predictor 266 may be configured with one or more parameters to trigger alert(s) based on an identified potential failure. For example, when the monitored task execution(s) 264 is detected to exhibit behavior(s) in breach of these configured one or more parameters, an alert may be initiated, for example, for transmission to the replication tool 208. In some embodiments, the one or more parameters may be configured with static values, static values specific to buckets and/or objects for replication, static values specific to bucket owner, and the like. In some embodiments, these parameters may be configured dynamically, for example, based on various contextual information related to replication job(s) (e.g., contextual information of source bucket(s), destination bucket(s), hosting cloud storage service(s) in respective geographical region(s), bucket owner(s), object owner(s), etc.). In some embodiments, the dynamic configuration of these parameters may be based on one or more machine learning techniques as well. For example, the predictor 256 may nevertheless be trained to adjust these parameter in run time.

In some embodiments, the trained predictor 266 may be utilized to detect unusual pattern(s) that deviates from normal replication pattern(s) that is, for example, learned in the training phase 252. Various embodiments herein may be configured such that normal replication pattern(s) may be established for replications involving, for example, source bucket(s), destination bucket(s), hosting cloud storage service(s) in respective geographical region(s), bucket owner(s), object owner(s), particular time of day, particular day of week, particular week of month, particular month of year, and so on. In some embodiments, the norm based on which the trained predictor 266 detects such deviation may be based on any suitable criteria. For example, the deviation may be detected upon a static definition of difference from the normal pattern(s), a dynamically configured definition of difference from the normal pattern(s), and/or a machine learned definition of difference from the normal pattern(s).

Figure 3A:
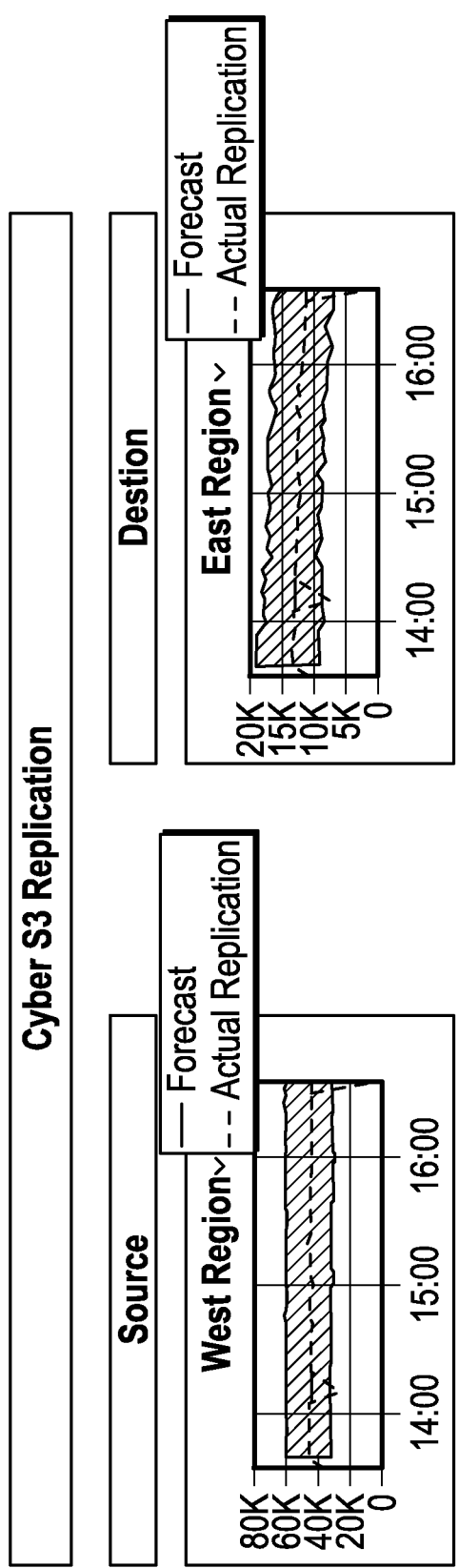
FIGS. 3A-3D are diagrams of exemplary performance graphs involving features associated with data replication (e.g., object replication), in accordance with certain embodiments of the present disclosure.
Figure 3B:
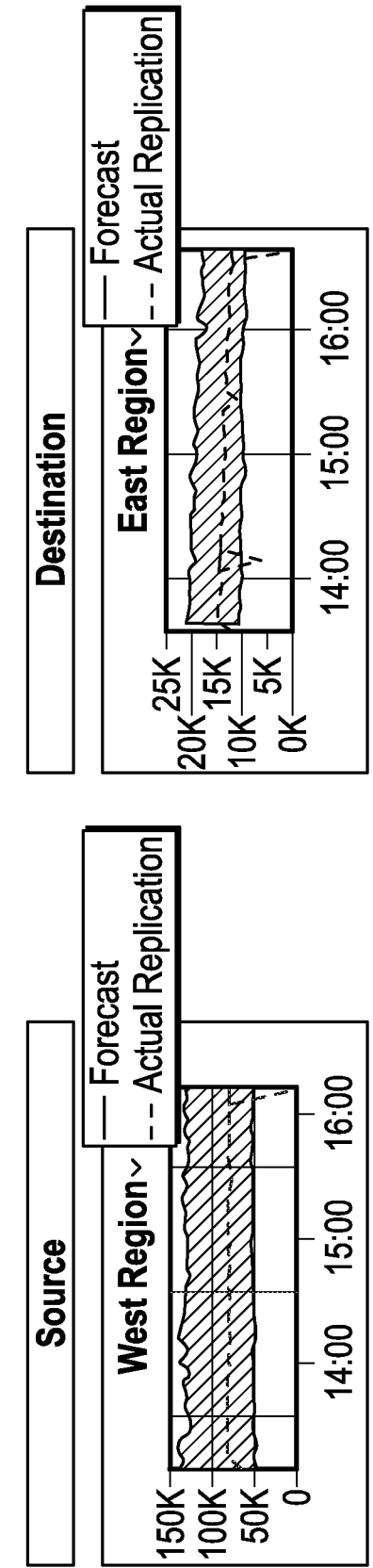
Figure 3C:
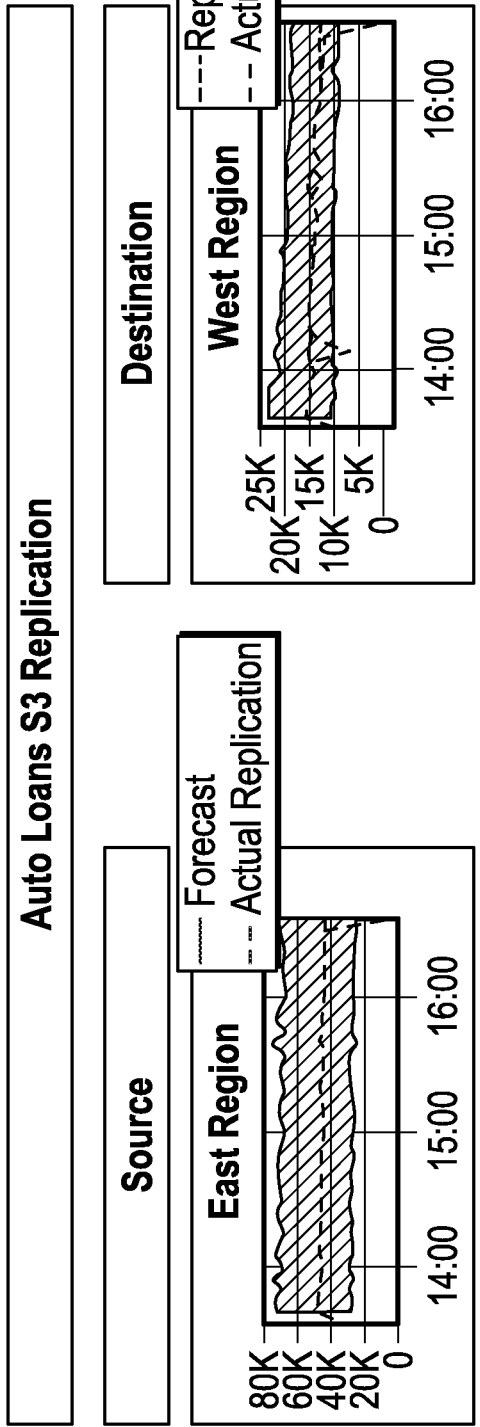
Figure 3D:
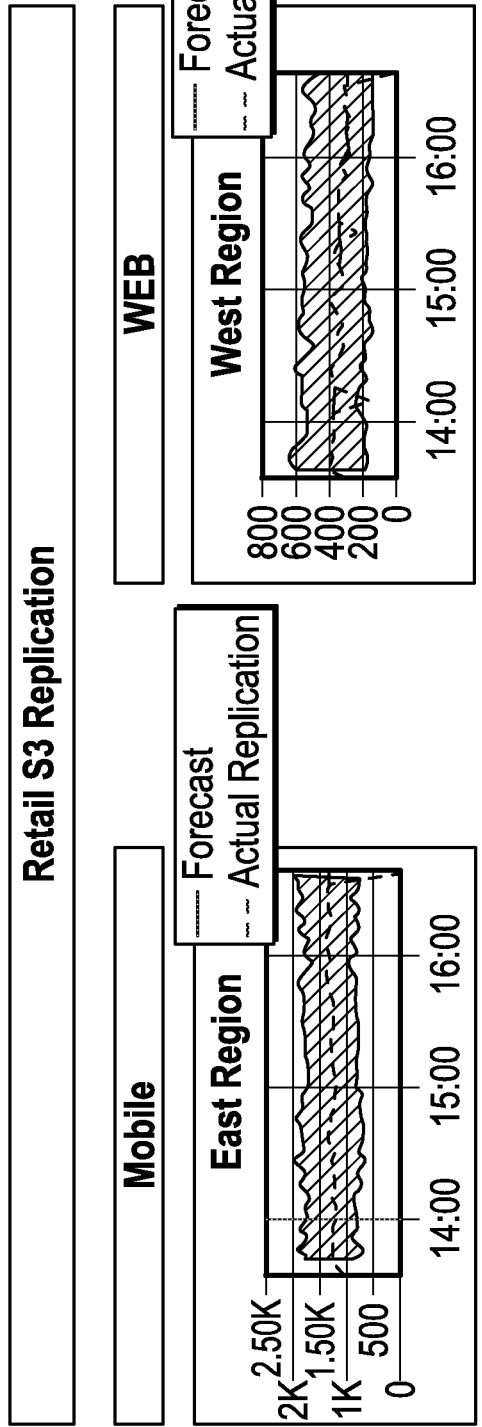

FIGS. 3A-3D are diagrams illustrating exemplary partial performance graphs involving features associated with object replication, consistent with exemplary aspects of certain embodiments of the present disclosure. In FIG. 3A, two exemplary partial performance graphs are shown side by side to illustrate a comparison between replications of cyber objects performed in a source bucket and a destination bucket, during a same period of time. In this example, the source bucket is in a cloud storage service hosted in the West region; while the destination bucket is in a cloud storage service hosted in the East region. That is, objects in the source bucket are archived in a cross region manner (e.g., the source bucket is enabled with, for example, CRR service of Amazon's AWS). Here, for both the East region and the West region, forecast replication and actual replication are reflected in the graph. Similarly, in FIG. 3B-3D, exemplary partial performance graphs are shown side by side to illustrate a comparison between replications of card objects, auto loan objects, retail objects performed in a respective source bucket and a respective destination bucket, during a same period of time. In those examples, each source bucket is in a cloud storage service hosted in the West region; while each destination bucket is in a cloud storage service hosted in the East region. Also similarly, objects in each of those source buckets are archived in a cross region manner (e.g., each source bucket is enabled with, for example, CRR service of Amazon's AWS). For both the East region and the West region, forecast replication and actual replication are reflected in the graphs illustrated herein.

Figure 3E:
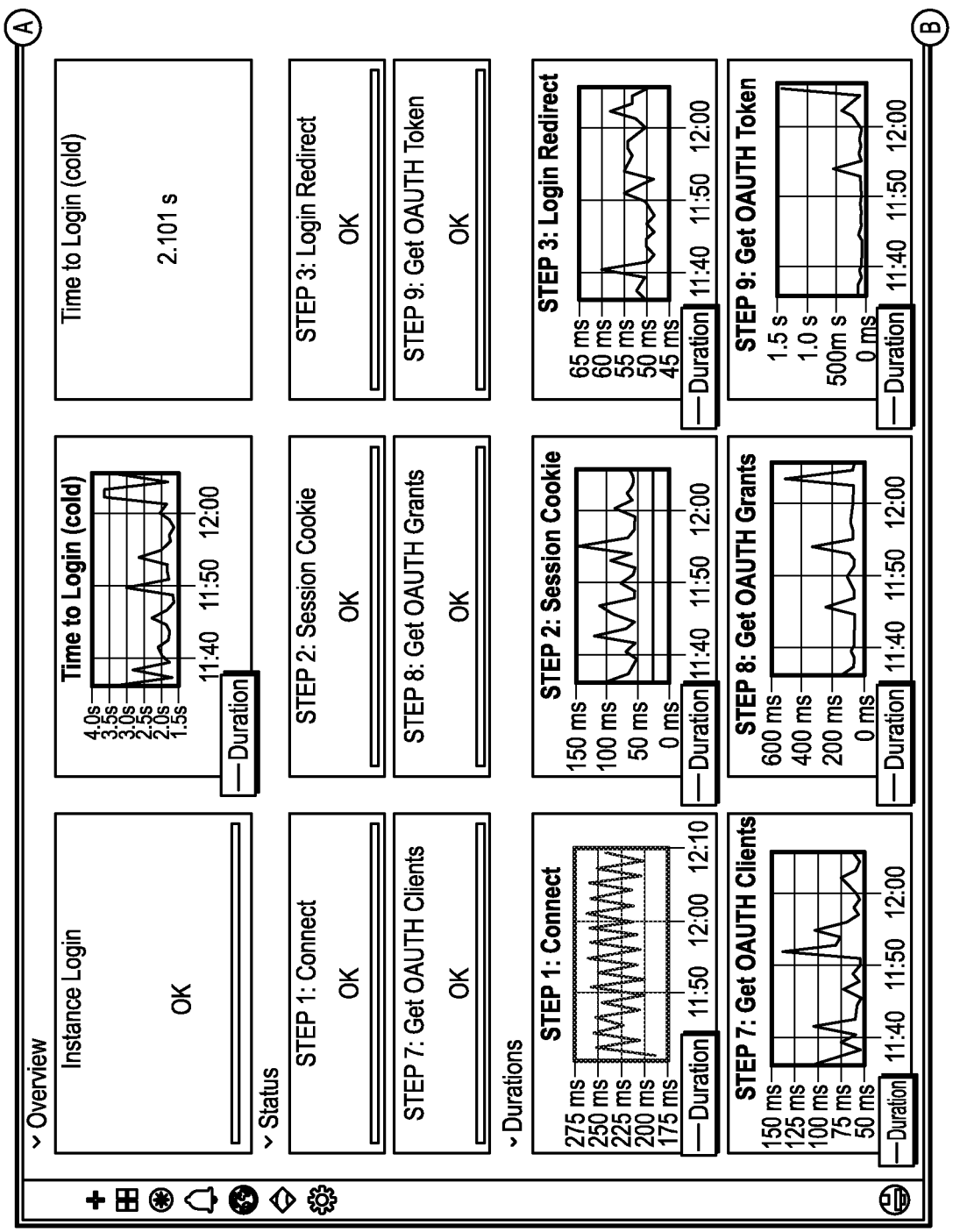
FIG. 3E is a diagram of an exemplary graphical user interface (GUI) involving features associated with data replication (e.g., object replication), in accordance with certain embodiments of the present disclosure.
Figure 3E:
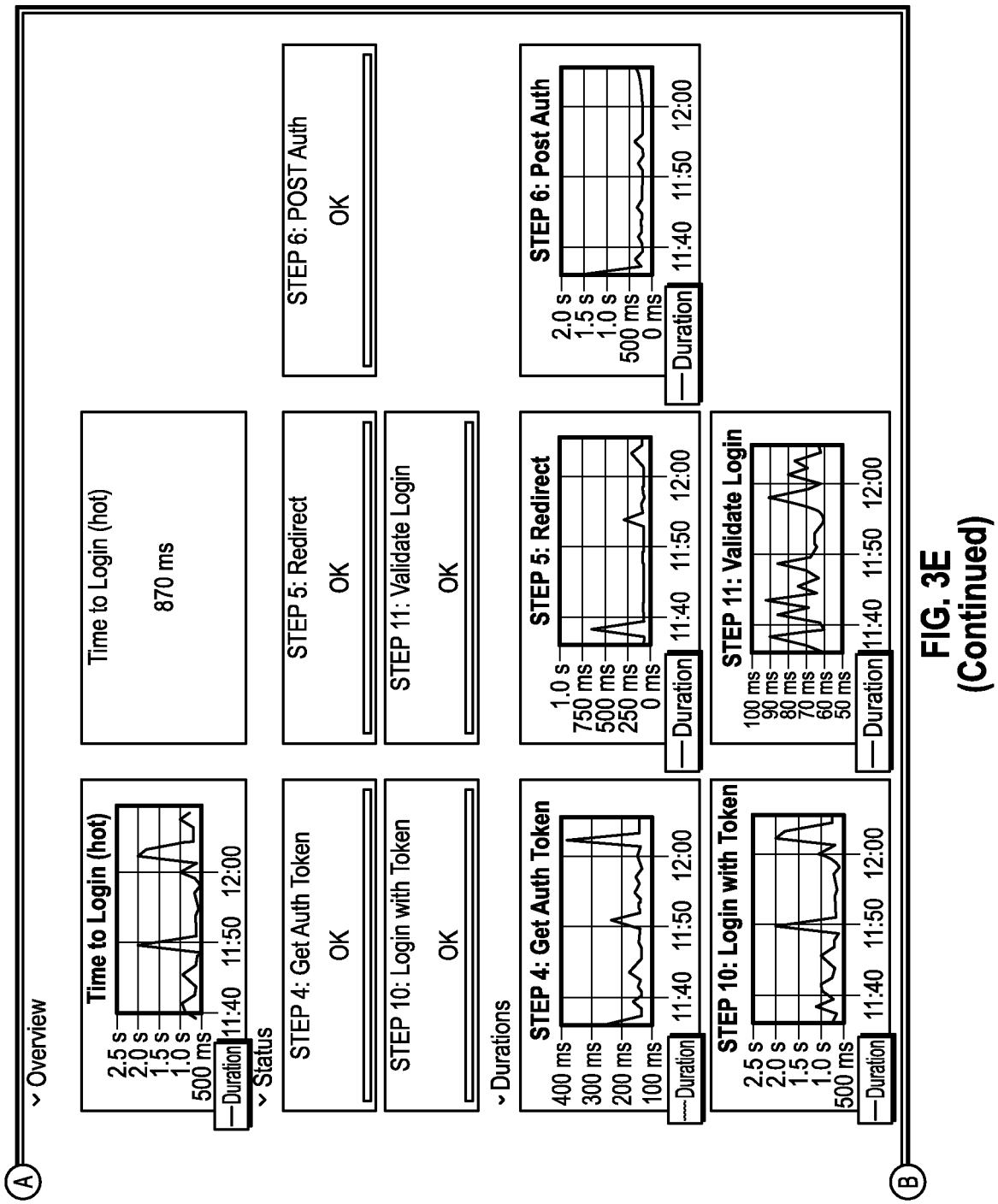

FIG. 3E is a diagram illustrating an exemplary graphical user interface (GUI) involving features associated with object replication, consistent with exemplary aspects of certain embodiments of the present disclosure. In this example, the exemplary GUI may be configured to display a dashboard depicting a plurality of replication health assessments corresponding to various stages (e.g., steps) in connection with an instance login process. As illustrated in FIG. 3E, the dashboard may display at the top region an overview section including a series of GUI elements. For example, the overview section may include a status button indicting the instance login as "OK," a graph depicting a "Time to Login (cold)," a display of an amount of "Time to Login (cold)," a graph depicting a "Time to Login (hot)," and a display of an amount of "Time to Login (hot)." Further, the dashboard may display in the middle region a status section including a series of buttons representing the status of the replication system assessed upon each stages. In this illustrative example, the stages related to an instance login may include a series of step one through step eleven, corresponding to events of "connect", "session cookie," "login redirect," "get auth token," "redirect", "post auth," "get oauth client," "get oauth grants," "get oauth token," "login with token," and "validate login," respectively. In this example illustrated in FIG. 3E, each button in the series displays the status for the respective stage as "OK." The dashboard may also display in the bottom region a durations section including a series of graphs depicting an amount of duration (along the Y axis) and relation to a progression of time (along the X axis), for each step displayed in the status section.

Figure 4:
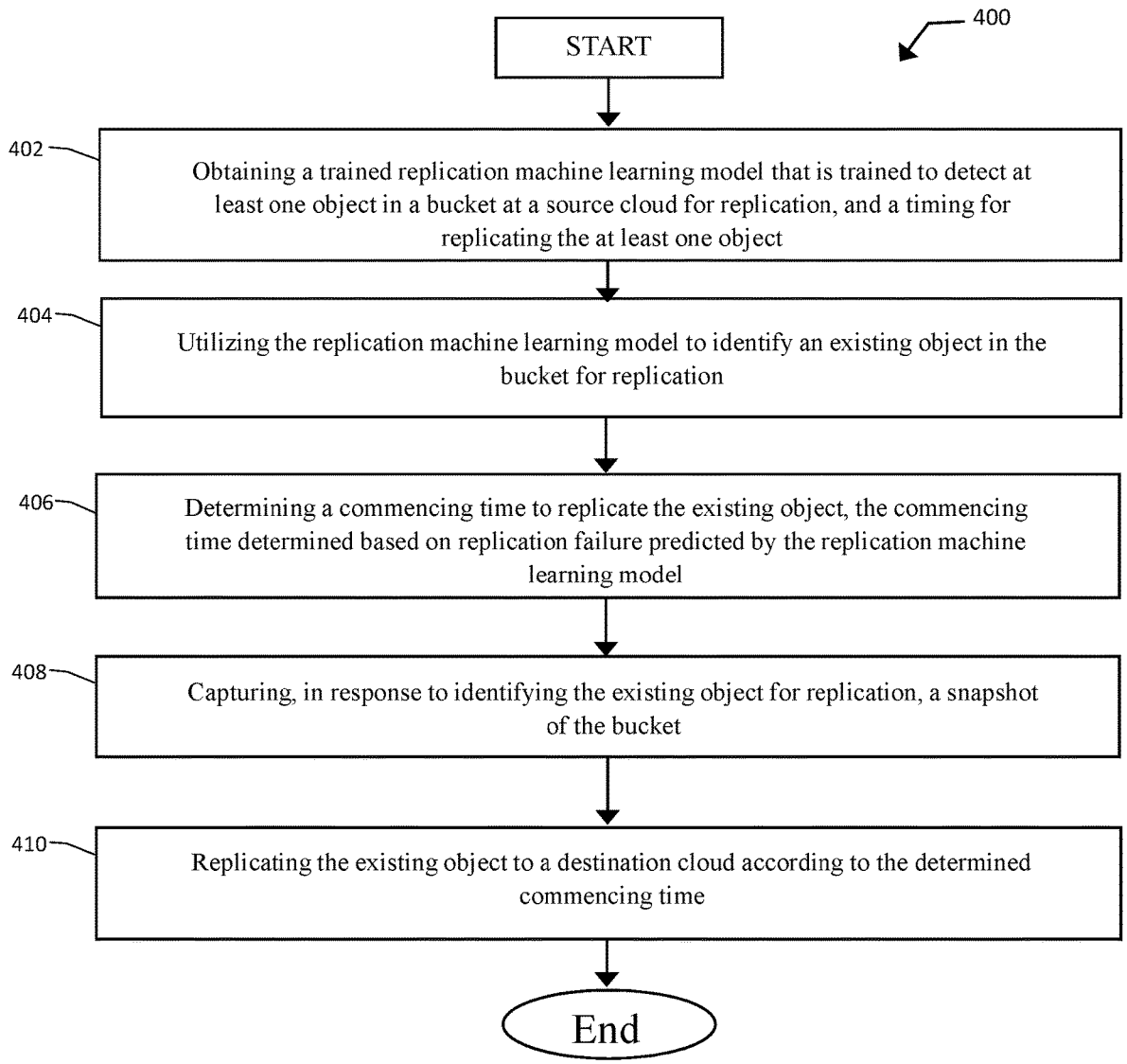
FIG. 4 is a flowchart illustrating an exemplary process related to object replication, consistent with exemplary aspects of certain embodiments of the present disclosure.

FIG. 4 is a flow diagram illustrating an exemplary process 400 related to object replication via one or more machine learning techniques, consistent with exemplary aspects of at least some embodiments of the present disclosure. Referring to FIG. 4, the illustrative object replication process 400 may include: obtaining a trained replication machine learning model that is trained to detect at least one object in a bucket at a source cloud for replication, and a timing for replicating the at least one object, at 402; utilizing the replication machine learning model to identify an existing object in the bucket for replication, at 404; determining a commencing time to replicate the existing object, the commencing time determined based on replication failure predicted by the replication machine learning model, at 406; capturing, in response to identifying the existing object for replication, a snapshot of the bucket, at 408; and replicating the existing object to a destination cloud according to the determined commencing time, at 410. In other embodiments, the object replication process 400 may be carried out, in whole or in part, in conjunction with a server, a transacting device, and/or a mobile device that is connected via one or more networks to the server, which is executing instructions for performing one or more steps or aspects of various embodiments described herein.

In some embodiments, the object replication process 400 may include, at 402, a step of obtaining a trained replication machine learning model that is trained to detect at least one object in a bucket at a source cloud for replication, and a timing for replicating the at least one object. With regard to the disclosed innovation, the replication machine learning model may be trained based at least in part on training data including one or more of: i) a plurality of historically replicated objects; ii) a plurality of historical replication patterns; and/or (iii) a plurality of historical replication failure events. In some implementations, the plurality of historically replicated objects, historical replication patterns, and/or historical replication failure events may correspond to the replication events involving the objects in the same bucket. In other embodiments, the plurality of historically replicated objects, historical replication patterns, and/or historical replication failure events information may, additionally or independently, correspond to replication events involving one or more objects in different bucket(s). In some embodiments, the above-described training data may be obtained from the job log(s) 254 illustrated in FIG. 2B, the details of which are not repeated herein.

In some embodiments, the replication machine learning model may include one or more of: a regression model, a classifier, or a recommendation model for training with the above described training data. Details of these models are similar to those embodiments illustrated with reference to FIG. 2B and are not repeated herein. In some implementations, the regression model, classifier, or recommendation model may be trained with the same set of training data, and/or different set of training data suitable, not limited by the embodiments of FIG. 2B.

In some embodiments, the replication machine learning model may be trained via a server (e.g., the computing device 101 of FIG. 1), such as a processor of a computer platform, or an online computer platform. In some embodiments, the processor is associated with an entity that provides a financial service to the user. Here, for example, the at least one computer platform may include a financial service provider (FSP) system. This FSP system may include one or more servers and/or processors associated with a financial service entity that provides, maintains, manages, or otherwise offers financial services. Such financial service entity may include a bank, credit card issuer, or any other type of financial service entity that generates, provides, manages, and/or maintains financial service accounts for one or more customers. In other embodiments, the FSP system may outsource the training to a third-party model generator, or otherwise leverage the training data (e.g., the plurality of historically replicated objects, historical replication patterns, historical replication failure events), and/or trained models from a third-party data source, third-party machine learning model generators, and the like.

It should be further understood that, in some embodiments, the replication machine learning model may be trained via a server (e.g., the computing device 101) in conjunction with a computing device associated with cloud storage services (e.g., the cloud storage services 110, 114, and 118). Here, for example, a computing device of a cloud storage service may be configured to initially train a baseline replication model based on the above-described training data pertaining to the first plurality of users utilizing the cloud storage service and/or a plurality of such training data from the plurality of third-party data sources. Subsequently, the baseline replication model may be transmitted to the server to be trained with the particular training data pertaining to object replication incurred by the server. In other words, a replication model may be trained in various manners as an entity-specific (e.g., cloud storage service subscriber specific) model in some implementations.

The object replication process 400 may include, at 404, a step of utilizing the replication machine learning model to identify an existing object in the bucket for replication. In some embodiments, the step 404 may be performed in response to the bucket being configured with a replication service. In some embodiments, such replication service may be a cross region replication (CRR) service that replicates an object in a source cloud storage serviced in a first region to a destination cloud storage serviced in a region other than the first region. Using the embodiment as illustrated in FIG. 1, a CRR may replicate one or more objects residing in the cloud storage service 110 to the cloud storage service 114, and/or cloud storage service 118.

In some embodiments, step 404 may include profiling the bucket based on sensitive data; and identifying the existing object based at least in part on the sensitive data. Sensitive data may include any information similar to the embodiments described above with reference to FIG. 2A. In some embodiments, sensitive data may be classified into a set of level of criticalness, and/or a set of priorities for the purpose of replication. Based on the critical levels and/or priority in replication, the object replication process 400 may designate or impute the same classification to the object(s) including the sensitive data. For example, for an existing objects including multiple items of sensitive data, the object replication process 400 may designate the highest priority as the priority for the whole object. Accordingly, the object replication process 400 may apply the trained machine learning model corresponding to the classification of the existing object to predict, for example, a commencing time for replicating the existing object(s), the details of which are described with reference to step 406, below.

In some embodiment, the step 404 may identify an entire bucket for replication upon identifying any sensitive data in the particular bucket. Similarly, in some embodiments, the step 404 may designate the level of criticalness or priority in replication for the bucket based on the classification of the sensitive data included therein, as described above.

In some embodiments, the step 404 may be performed in response to one or more net new objects in the bucket being provisioned with a backup service of, for example, archiving from a source cloud storage to a destination cloud storage. In some embodiments, the source cloud storage service and the destination cloud storage service may be hosted in two different geographical regions. In some embodiments, the one or more net new objects may not be counted in the pool of existing objects of the bucket for the purpose of applying the replication machine learning model, at the point of time when a backup service is provisioned for those new objects. In doing so, the object replication process 400 may seize upon the newly provisioned backup event to scrutinize the inventory of existing objects in the bucket to perform additional object archiving. For example, even though each existing objects has once been a net new object to the bucket, some objects may have been provisioned with the above-described Amazon S3 service at the time those objects are added to the bucket. Some objects may have already been provisioned for backup by the object replication process 400 at a time after being added to the bucket. Yet some objects may have never been provisioned with a backup service either by Amazon S3 or the replication process 400. In any event, regardless whether or not the one or more existing objects may have a replica at a respective destination bucket, the object replication process 400 may utilize the replication machine learning model to identify existing objects for replication among those existing object.

As a result, existing object(s) identified as for replication may end up having multiple copies of replica (e.g., when the object has been archived when added to the bucket), or at least one copy of replica (e.g., when the object has not been archived when added to the bucket) generated by the object replication process 400. In some embodiments, as the existing objects(s) may have been modified between the last backup and the step 404, those existing object(s) may end up with multiple copies of replica corresponding to the respective versions of modification. Accordingly, enhanced with such replication for existing objects, the object replication process 400 may fortify the known process of archiving objects with more robustness and comprehensiveness in duplicity, leading to more resilient and holistic data recovery when needed.

In other embodiments, the step 404 may be triggered by various suitable condition(s) and/or event(s). For example, the object replication process 400 may perform step 404 based on a fixed schedule (e.g., weekly, monthly, quarterly), a dynamically determined schedule, or a combination thereof. A schedule may be dynamically determined based on various contextual information such as, a timing, a failure to replicate an object in the bucket or other buckets, a failure reported for the cloud storage service hosted in another region, a geo-location the destination cloud storage service, and the like. In some embodiments, the step 404 may be triggered by the prediction made by one or more machine learning based techniques, such as, the trained predictor 266 of FIG. 2B in connection with monitoring various task executions.

The object replication process 400 may include, at 406, a step of determining a commencing time to replicate the existing object, the commencing time determined based on replication failure predicted by the replication machine learning model. In some embodiments, when applying a trained regression machine learning model as above described, the object replication process 400 may predict the commencing time as an exact point of time, and/or how much time left before the predicted replication failure occurs. In some embodiment when applying a trained classification machine learning model as above described, the object replication process 400 may predict the commencing time in the form of whether the replication is needed immediately. In some embodiments when applying a trained recommendation machine learning model as above described, the object replication process 400 may predict the commencing time in the form of a list of recommended replications, a list of dis-recommended replications, or some combinations thereof.

Using the example as above illustrated with reference to FIG. 2B, for the existing object(s) classified as critical or having a high priority in terms of replication, the object replication process 400 may utilize the trained replication machine learning model that is based on a regression model so that to predict a window of time during which a replication suffices to provide timely backup against a predicted failure. Accordingly, the step 406 may designate any time, or a time based on various other criteria, within the window of time, as the determined commencing time for replication. When the existing objects is assigned with a lower priority in replication, the object replication process 400 may utilize the trained replication machine learning model that is based on a classifier so that to predict whether a replication failure is imminent. Accordingly, the step 406 may designate an immediate time as the determined commencing time for replication. In the scenarios where a recommendation engine model is utilized to predict one or more fixes to remedy the predicted replication failure, the recommended fix(es) may be matched to the determined one or more existent objects in the source bucket such that the existent object(s) that is(are) also recommended by the recommendation engine model will be designated with an immediate time as the determined commencing time. In some embodiments, the remaining determined existent object(s) for replication may be assigned a replication commencing time based on, for example, the application of a regression model, or a classifier, depending on their respective priority level for replication.

The object replication process 400 may include, at 408, a step of capturing, in response to identifying the existing object for replication, a snapshot of the bucket. In some embodiments, the snapshot may include information related to at least one of: the identified existing object(s), the metadata of the identified existing object(s), or an access control list (ACL) of the identified existing object(s). Details of the snapshot, metadata, and ACL similar to those described above with reference to FIG. 2A are not repeated herein. Other embodiments may be configured that any suitable information related to replicating identified existing objects in the source bucket can be recorded as a snapshot. In other words, based on the information included in the snapshot, an existing object in the source bucket can be replicated without losing any information pertinent thereto.

The object replication process 400 may include, at 410, a step of replicating the existing object to a destination cloud according to the determined commencing time. In some embodiments, the destination cloud may be hosted at a cross region cloud storage. For example, the destination cloud may be the same cloud utilized as the destination cloud based on which a CRR service is enabled for net new object(s) in the source cloud. In some embodiments, the step 410 may include replicating one or more of: data associated with the identified existing object(s), one or more tags associated with the identified existing object(s), one or more ACLs associated with the identified existing object, or one or more encryption states associated with the existing object. In some implementations, the step 410 may replicate the identified existing objects in the form of at least three copies of data, e.g., three copies of replica for the identified existing object. For example, the step 410 may generate two copies of replica on two different hardware medium, and one copy of replica in an offsite storage.

Here, continuing to use Amazon S3 enabled backup service as a non-limiting example, the object replication process 400 may use a GET command to read objects from the source bucket, a POST command to save a replica of existing object(s) to the destination bucket, and the like.

In some embodiments, the object replication process 400 may further include a step of performing integrity check on the replicating of the identified existing object by validating one or more entity tags (e-tags) associated with the identified existing object.

In some embodiments, the object replication process 400 may further include a step of throttling, by the one or more processors, the replicating the existing object to the destination cloud. In some embodiments, the throttling may be based at least in part on replication failures predicted by the replication machine learning model.

In some embodiments, the object replication process 400 may further include a step of providing, by the one or more processors, a graphical user interface for displaying a visualization of a progress associated with the replicating the existing object.

Figure 5:
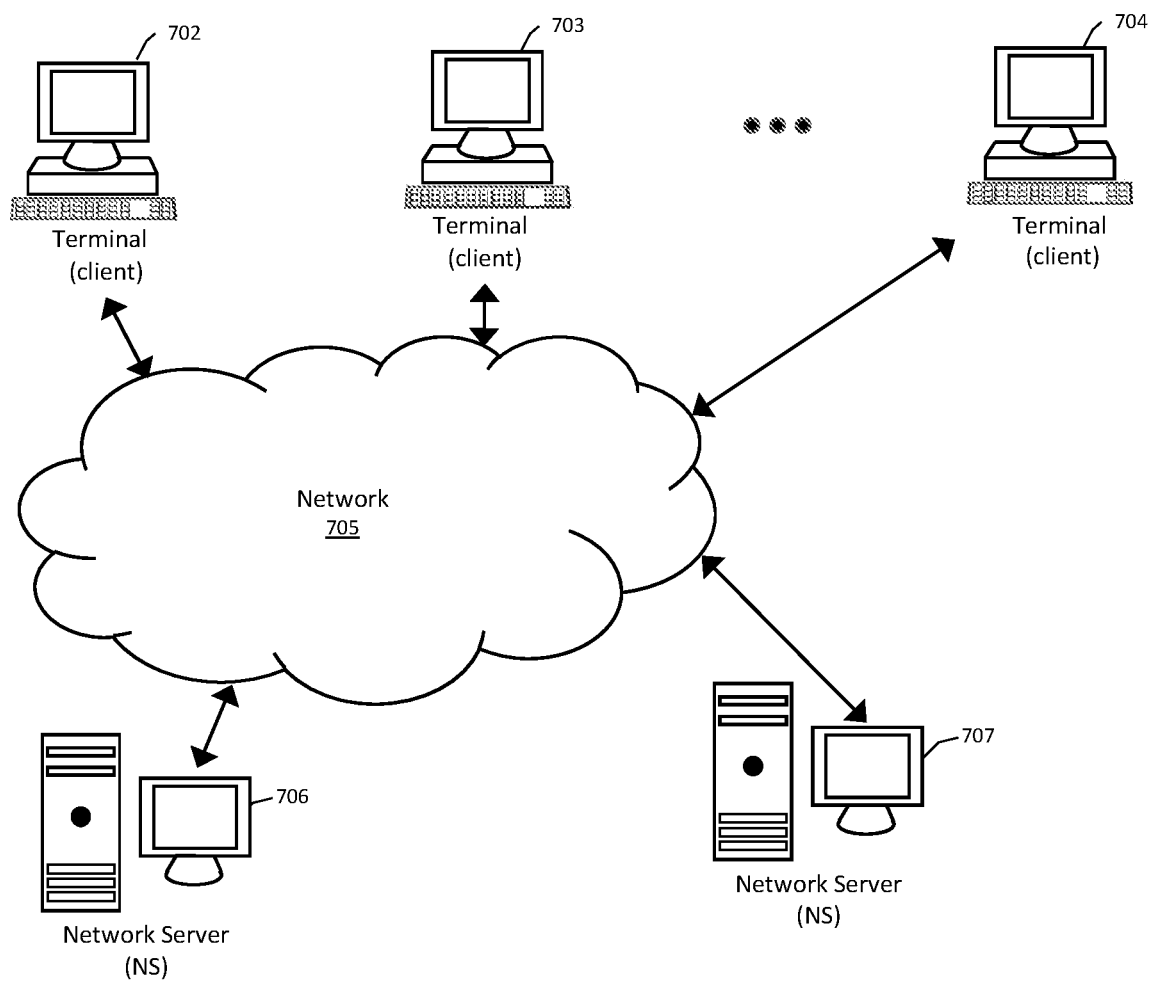
FIG. 5 is a block diagram depicting an exemplary computer-based system, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates various strategies for assessing the data, caching, searching, and/or database connection pooling. An example of the scalable architecture is an architecture that is capable of operating multiple servers.

In some embodiments, referring to FIG. 5, members 702-704 (e.g., clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be configured to implement part of the entirety of the features and functionalities above-described for the computing device 180 of FIG. 1. In some embodiments, the servers 706 and 707 may be configured to implement part of the entirety of the features and functionalities above-described for the computing device 101 of FIG. 1. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content sources, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
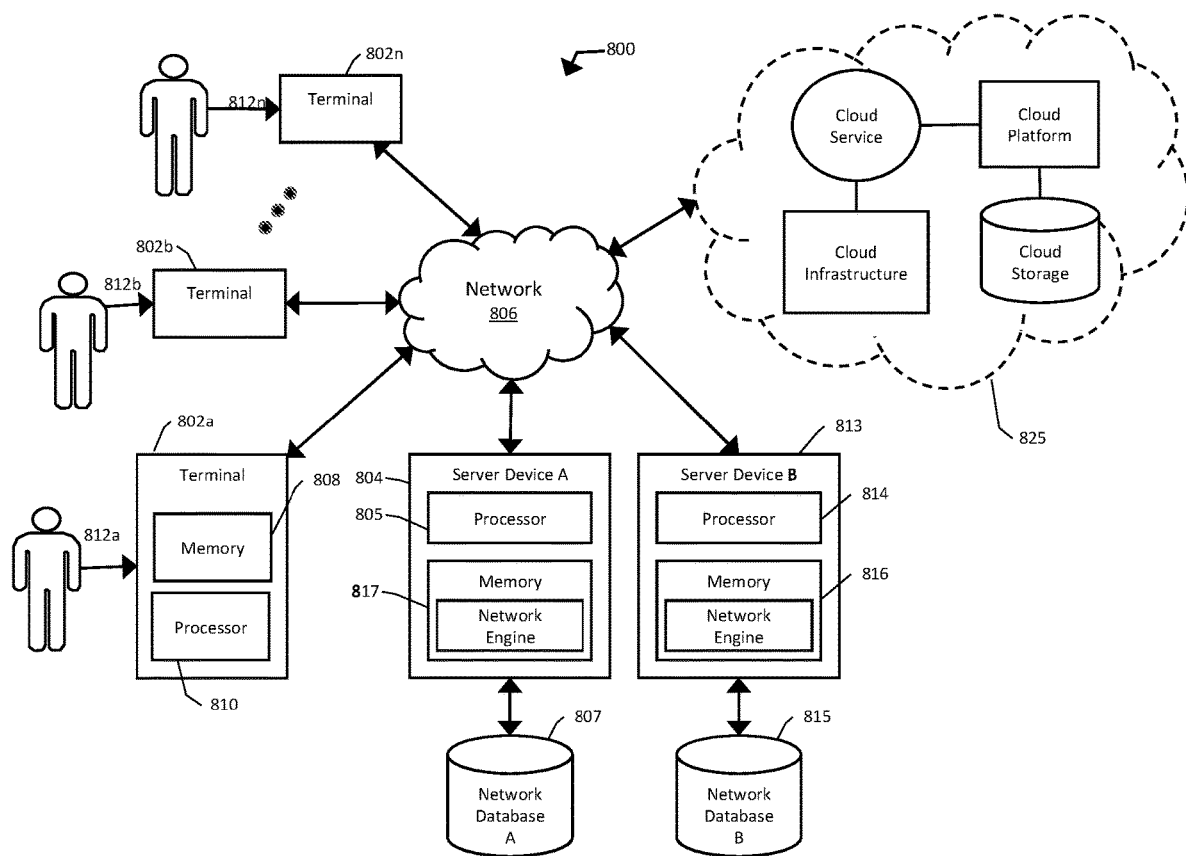
FIG. 6 is a block diagram depicting another exemplary computer-based system, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., clients) 802a, 802b through 802n shown each at least includes non-transitory computer-readable media, such as a random-access memory (RAM) 808 coupled to a processor 810 and/or memory 808. In some embodiments, the member computing devices 802a, 802b through 802n may be configured to implement part of the entirety of the features and functionalities above-described for the computing device 180 of FIG. 1. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable non-transitory media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and etc.

In some embodiments, member computing devices 802a through 802n may also include a number of external or internal devices such as a mouse, a CD-ROM, DVD, a physical or virtual keyboard, a display, a speaker, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™, Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806.

As shown in FIG. 6, exemplary server devices 804 and 813 may be also coupled to the network 806. In some embodiments, one or more member computing devices 802a through 802n may be mobile clients. In some embodiments, the server devices 804 and 813 may be configured to implement part of the entirety of the features and functionalities above-described for the computing device 101 of FIG. 1. In some embodiments, server devices 804 and 813 shown each at least includes respective computer-readable media, such as a random-access memory (RAM) coupled to a respective processor 805, 814 and/or respective memory 817, 816. In some embodiments, the processor 805, 814 may execute computer-executable program instructions stored in memory 817, 816, respectively. In some embodiments, the processor 805, 814 may include a microprocessor, an ASIC, and/or a state machine. In some embodiments, the processor 805, 814 may include, or may be in communication with, media, for example computer-readable media, which stores instructions that, when executed by the processor 805, 814, may cause the processor 805, 814 to perform one or more steps described herein. In some embodiments, examples of computer-readable media may include, but are not limited to, an electronic, optical, magnetic, or other storage or transmission device capable of providing a processor, such as the respective processor 805, 814 of server devices 804 and 813, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and etc.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
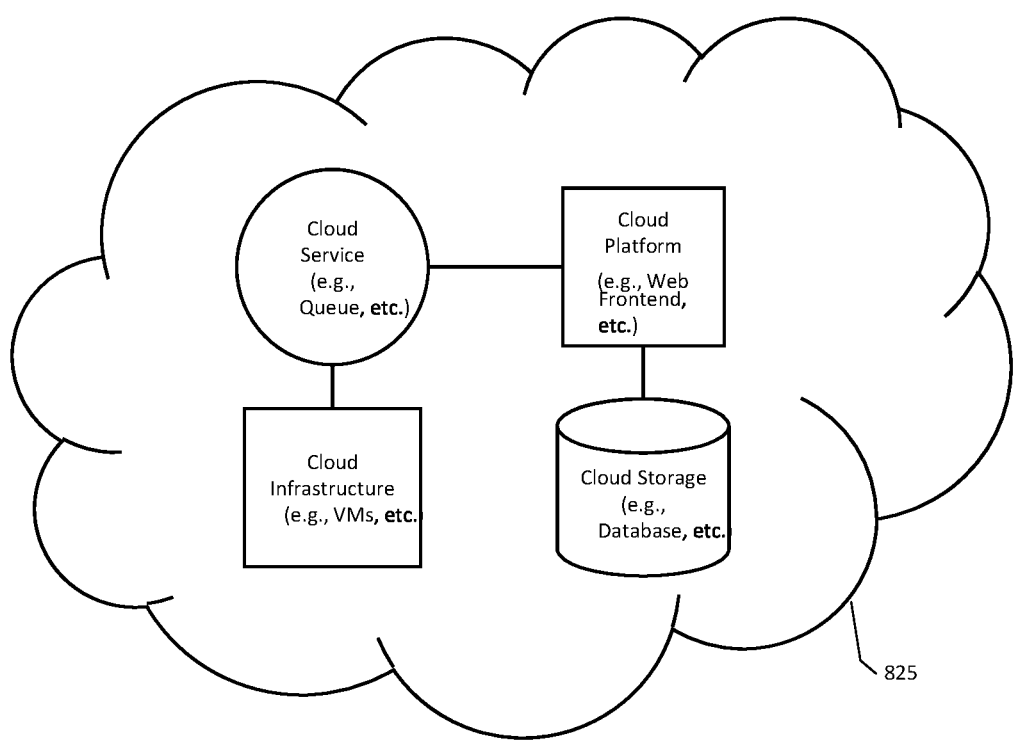
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
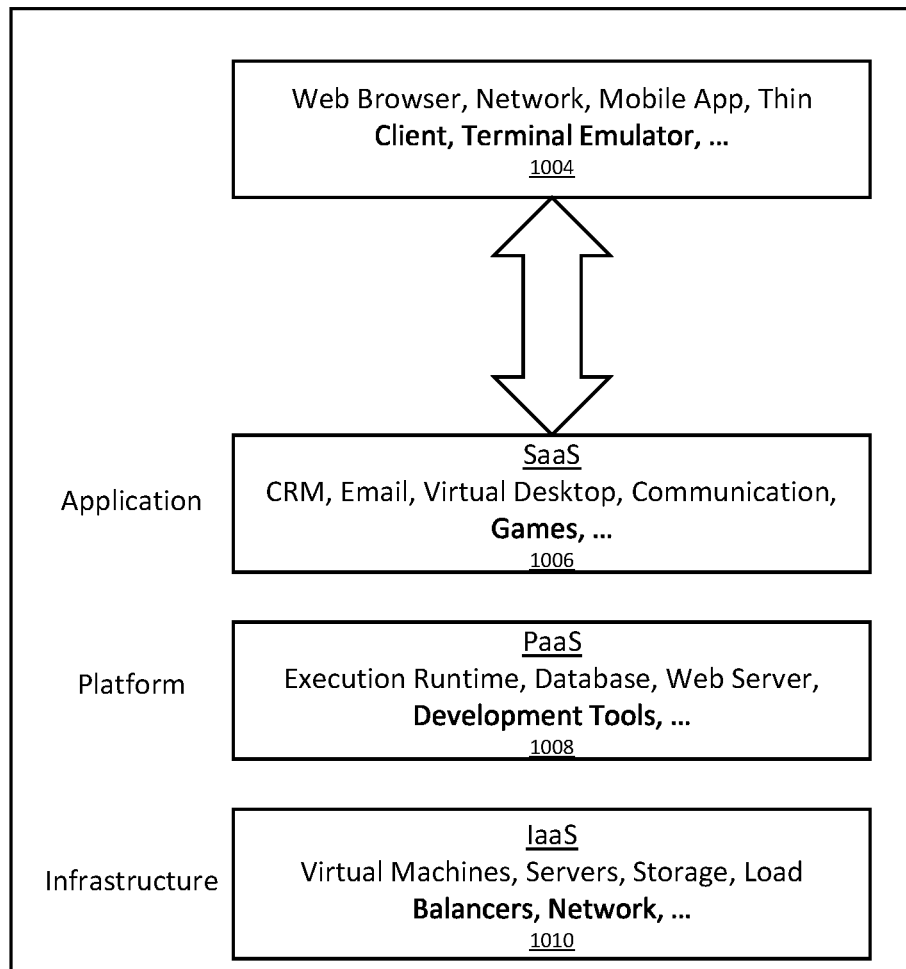

As also shown in FIGS. 7 and 8, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices (e.g., the server 10, and/or the computing device 180 illustrated in FIG. 1) are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enabled devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms; (18) JavaFX™; (19) JavaFX Mobile;™ (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software miming on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider/source. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method including:
 obtaining, by one or more processors, a trained replication machine learning model that is trained to detect at least one object in a bucket at a source cloud for replication, and a timing for replicating the at least one object;
 utilizing, by the one or more processors and in response to the bucket being configured with a cross region replication (CRR) service, the replication machine learning model to identify an existing object in the bucket for replication;
 determining, by the one or more processors, a commencing time to replicate the existing object, the commencing time determined based on replication failure predicted by the replication machine learning model;
 capturing, by the one or more processors and in response to identifying the existing object for replication, a snapshot of the bucket, the snapshot including information related to at least one of: the existing object, metadata of the existing object, and/or an access control list (ACL) of the existing object; and
 replicating, by the one or more processors, the existing object to a destination cloud according to the determined commencing time, the destination cloud being hosted at a cross-region storage.

Clause 2. The method of clause 1 or any clause herein, where the replicating the existing object includes:
 replicating, by the one or more processors, at least one of: data associated with the existing object, one or more tags associated with the existing object, one or more ACLs associated with the existing object, and one or more encryption states associated with the existing object.

Clause 3. The method of clause 1 or any clause herein, further including:
 performing, by the one or more processors, integrity check on the replicating the existing object by validating one or more entity tags (e-tags) associated with the existing object.

Clause 4. The method of clause 1 or any clause herein, where the destination cloud is the same cloud utilized in the CRR service.

Clause 5. The method of clause 1 or any clause herein, further including:
 throttling, by the one or more processors, the replicating the existing object to the destination cloud.

Clause 6. The method of clause 5 or any clause herein, where the throttling is based at least in part on replication failures predicted by the replication machine learning model.

Clause 7. The method of clause 1 or any clause herein, further including:
 providing, by the one or more processors, a graphical user interface for displaying a visualization of a progress associated with the replicating the existing object.

Clause 8. The method of clause 1 or any clause herein, further including:
generating, by the one or more processors, three copies of data replicated for the existing object Clause 9. The method of clause 1 or any clause herein, where the identifying an existing object in a bucket includes:
profiling the bucket based on sensitive data; and
identifying the existing object based at least in part on the sensitive data.

Clause 10. The method of clause 1 or any clause herein, where the machine learning model includes at least one of: a regression model, a classification model, and a recommendation engine model.

Clause 11. The method of clause 1 or any clause herein, further including:
determining, by the one or more processors, a critical level for the existing objects based at least in part on a classification of sensitive data included in the existing objects; and
utilizing, by the one or more processors, the trained replication machine learning model based on the critical level.

Clause 12, A system including:
one or more processors; and
a memory in communication with the one or more processors and storing instructions that, when executed by the one or more processors, cause the one or more processors to:
obtain a trained replication machine learning model that is trained to detect at least one object in a bucket at a source cloud for replication, and a timing for replicating the at least one object;
utilize, in response to the bucket being configured with a cross region replication (CRR) service, the replication machine learning model to identify an existing object in the bucket for replication;
determine a commencing time to replicate the existing object, the commencing time determined based on replication failure predicted by the replication machine learning model;
capture, in response to identifying the existing object for replication, a snapshot of the bucket, the snapshot including information related to at least one of: the existing object, metadata of the existing object, and/or an access control list (ACL) of the existing object; and
replicate the existing object to a destination cloud according to the determined commencing time, the destination cloud being hosted at a cross-region storage.

Clause 13. The system of clause 12 or any clause herein, where to replicate the existing object includes to:
replicate at least one of: data associated with the existing object, one or more tags associated with the existing object, one or more ACLs associated with the existing object, and one or more encryption states associated with the existing object.

Clause 14. The system of clause 12 or any clause herein, where the instructions further cause the one or more processors to:
perform integrity check on the replicating the existing object by validating one or more entity tags (e-tags) associated with the existing object.

Clause 15. The system of clause 12 or any clause herein, where the destination cloud is the same cloud utilized in the CRR service.

Clause 16. The system of clause 10 or any clause herein, where the instructions further cause the one or more processors to throttle the replicating the existing object to the destination cloud.

Clause 17. The system of clause 16 or any clause herein, where to throttle the replicating the existing objects is based at least in part on replication failures predicted by the replication machine learning model.

Clause 18. The system of clause 17 or any clause herein, where the instructions further cause the one or more processors to profile the bucket based on sensitive data; and identify the existing object based at least in part on the sensitive data.

Clause 19. The system of clause 12 or any clause herein, where the replication machine learning model includes at least one of: a regression model, a classification model, and a recommendation engine model.

Clause 20. A non-transitory computer readable storage medium for tangibly storing computer program instructions capable of being executed by a computer processor, the computer program instructions defining the steps of:
obtaining, by one or more processors, a trained replication machine learning model that is trained to detect at least one object in a bucket at a source cloud for replication, and a timing for replicating the at least one object, where the training is based at least in part on training data pertaining to a least one of:
a plurality of historically replicated objects;
a plurality of historical replication patterns; and/or
a plurality of historical replication failure events;
utilizing, by the one or more processors and in response to the bucket being configured with a cross region replication (CRR) service, the replication machine learning model to identify an existing object in the bucket for replication;
determining, by the one or more processors, a commencing time to replicate the existing object, the commencing time determined based on replication failure predicted by the replication machine learning model;
capturing, by the one or more processors and in response to identifying the existing object for replication, a snapshot of the bucket, the snapshot including information related to at least one of: the existing object, metadata of the existing object, and/or an access control list (ACL) of the existing object; and
replicating, by the one or more processors, the existing object to a destination cloud according to the determined commencing time, the destination cloud being hosted at a cross-region storage.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:
1. A method comprising:
obtaining, by one or more processors, a trained replication machine learning model that is trained to:
detect at least one object in a bucket at a source cloud for replication, analyze historical replication failure data associated with a plurality of replication failures, and determine a timing for replicating the at least one object;

utilizing, by the one or more processors and in response to the bucket being configured with a cross region replication (CRR) service, a replication tool, comprising the trained replication machine learning model, to:

identify at least one existing object in the bucket for replication, predict a replication failure based on the historical replication failure data, determine a commencing time to replicate the at least one existing object based on the replication failure, capture at least one snapshot of the bucket based on an identification of the at least one existing object, the at least one snapshot comprising information related to at least one of: the at least one existing object, metadata of the at least one existing object, or an access control list (ACL) of the at least one existing object, generate at least one new object based on the snapshot of the bucket and the replication failure, and replicate, when the replication failure occurs, the at least one new object-to a destination cloud according to the determined commencing time, the destination cloud being hosted at a cross-region storage.

2. The method of claim 1, wherein the replicate the at least one existing object comprises:

replicating, by the one or more processors, at least one of: data associated with the at least one existing object, one or more tags associated with the at least one existing object, one or more ACLs associated with the at least one existing object, and one or more encryption states associated with the at least one existing object.

3. The method of claim 1, further comprising:

performing, by the one or more processors, integrity check on the replicating the at least one existing object by validating one or more entity tags (e-tags) associated with the at least one existing object.

4. The method of claim 1, wherein the destination cloud is the same cloud utilized in the CRR service.

5. The method of claim 1, further comprising:

throttling, by the one or more processors, a replication of the at least one existing object to the destination cloud.

6. The method of claim 5, wherein the throttling is based at least in part on replication failures predicted by the trained replication machine learning model.

7. The method of claim 1, further comprising:

providing, by the one or more processors, a graphical user interface for displaying a visualization of a progress associated with the replication the at least one existing object.

8. The method of claim 1, further comprising:

generating, by the one or more processors, three copies of data replicated for the at least one existing object.

9. The method of claim 1, wherein the identify the at least one existing object in a bucket comprises:

profiling the bucket based on sensitive data; and identifying the at least one existing object based at least in part on the sensitive data.

10. The method of claim 1, wherein the trained replication machine learning model comprises at least one of: a regression model, a classification model, and a recommendation engine model.

11. The method of claim 1, further comprising:

determining, by the one or more processors, a critical level for the at least one existing object based at least in part on a classification of sensitive data included in the at least one existing objects; and utilizing, by the one or more processors, the trained replication machine learning model based on the critical level.

12. A system comprising:

one or more processors; and a memory in communication with the one or more processors and storing instructions that, when executed by the one or more processors, cause the one or more processors to:

obtain a trained replication machine learning model that is trained to;

detect at least one object in a bucket at a source cloud for replication, analyze historical replication failure data associated with a plurality of replication failures, and determine a timing for replicating the at least one object; and a replication tool utilizing the trained replication machine learning model to:

identify at least one existing object in the bucket for replication, predict a replication failure based on the historical data, determine a commencing time to replicate the at least one existing object based on the replication failure, capture at least one snapshot of the bucket based on the identification of the at least one existing object, the at least one snapshot comprising information related to at least one of: the at least one existing object, metadata of the at least one existing object, or an access control list (ACL) of the at least one existing object, generate at least one new object based on the at least one snapshot of the bucket and the replication failure, and replicate, when the replication failure occurs, the at least one new object to a destination cloud according to the determined commencing time, the destination cloud being hosted at a cross-region storage.

13. The system of claim 12, wherein to replicate the at least one existing object comprises:

replicate at least one of: data associated with the at least one existing object, one or more tags associated with the at least one existing object, one or more ACLs associated with the at least one existing object, and one or more encryption states associated with the at least one existing object.

14. The system of claim 12, wherein the instructions further cause the one or more processors to:

perform integrity check on replication of the at least one existing object by validating one or more entity tags (e-tags) associated with the at least one existing object.

15. The system of claim 12, wherein the destination cloud is the same cloud utilized in the CRR service.

16. The system of claim 12, wherein the instructions further cause the one or more processors to:

throttle a replication of the existing object to the destination cloud.

17. The system of claim 16, wherein to throttle the replication of the at least one existing objects is based at least in part on replication failures predicted by the trained replication machine learning model.

18. The system of claim 12, wherein the instructions further cause the one or more processors to:
  profile the bucket based on sensitive data; and
  identify the at least one existing object based at least in part on the sensitive data.

19. The system of claim 12, wherein the trained replication machine learning model comprises at least one of: a regression model, a classification model, and a recommendation engine model.

20. A non-transitory computer readable storage medium for tangibly storing computer program instructions capable of being executed by a computer processor, the computer program instructions defining the steps of:
  obtaining, by one or more processors, a trained replication machine learning model that is trained to;
    detect at least one object in a bucket at a source cloud for replication,
    analyze historical data associated with replication failure,
    and a timing for replicating the at least one object;
  utilizing, by the one or more processors and in response to the bucket being configured with a cross region replication (CRR) service, a replication tool, comprising the trained replication machine learning model, to:
    identify at least one existing object in the bucket for replication,
  predict a replication failure based on the historical data,
  determine a commencing time to replicate the at least one existing object based on the replication failure,
  capture at least one snapshot of the bucket based on the identification of the at least one existing object, the at least one snapshot comprising information related to at least one of: the at least one existing object, metadata of the at least one existing object, or an access control list (ACL) of the at least one existing object,
  generate at least one new object based on the snapshot of the bucket and the replication failure, and
  replicate, when the replication failure occurs, the at least one new object to a destination cloud according to the determined commencing time, the destination cloud being hosted at a cross-region storage.

* * * * *